Sept. 14, 1965                J. P. MONROE                3,206,652
                    ELECTROMAGNETIC FORCE APPARATUS
Filed Dec. 17, 1962                                  2 Sheets-Sheet 1

INVENTOR.
JAMES P. MONROE
BY
*Price & Heneveld*
ATTORNEYS

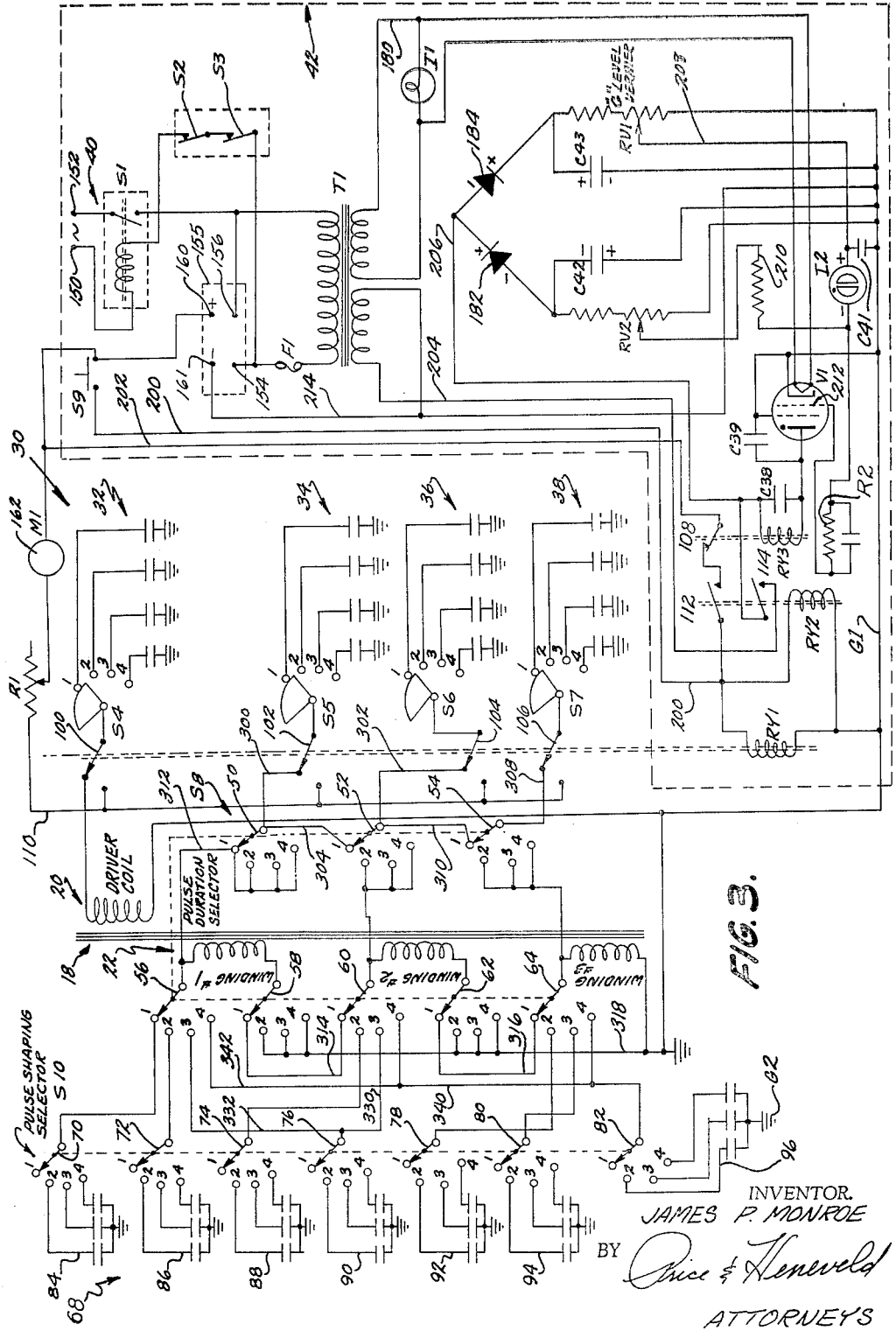

3,206,652
Patented Sept. 14, 1965

3,206,652
ELECTROMAGNETIC FORCE APPARATUS
James P. Monroe, Ann Arbor, Mich., assignor to Lear Siegler, Inc.
Filed Dec. 17, 1962, Ser. No. 245,143
7 Claims. (Cl. 317—151)

This invention relates to an electromagnetically actuated, physical shock apparatus, and more particularly to a shock apparatus employing a freely movable specimen-holding carriage powered by an electromagnetic pulse of accurately controlled intensity, duration, and shape.

Components of modern aircraft and space vehicles are subject to varying amounts of "G" forces during use. These "G" forces will vary in intensity, duration, and rate of increase, depending upon circumstances. Each of these variables can vary widely independently of the others. These components, for example instruments, should be subjected to testing after manufacturing and before installation to determine their suitability. There are also many other instances when devices should be subjected to accurately controlled physical shock conditions to determine their suitability for specific applications. No reliable apparatus of reasonable simplicity and expense has been available heretofore which would enable simulation of various operating conditions by varying these three parameters independently of each other, and in a closely controlled manner. Present shock testing apparatus requires constant change of mechanical features of the apparatus to render any shock variation, for example, changing of carriage impact arresting pads. This prior type of apparatus is not subject to close control. It is also limited to the variations possible.

It is therefore an object of this invention to provide an electromagnetically actuated, physical shock testing apparatus capable of subjecting test objects to "G" force pulses whose intensity, duration and shape may be varied independently of one another. The apparatus is thus capable of simulating practically any conceivable condition which could actually be encountered during use.

It is another object of this invention to provide an electromagnetic shock apparatus that utilizes a freely movable specimen-supporting carriage subject only to the electromagnetic pulse force and slight frictional drag. This feature enables the specimen to be subjected to shock pulses of any producible shape since the desired pulse shape is not destroyed by any significant counteracting forces on the specimen. The only counteracting force is a braking force which may or may not be applied, and if so, is applied after the significant portions of the shock wave are substantially completed.

It is still a further object of this invention to provide an electromagnetic shock apparatus capable of being formed from a conventional vibrator apparatus presently on the market, merely by a simple removal of a few vibrator parts. The resulting apparatus has been found to be extremely effective as a shock apparatus, and further requires no pulse amplification means. The apparatus is capable of effecting a mechanical shock by varying the physical acceleration of the specimen caused by the force of an electromagnetic discharge as controlled by electrical circuitry.

It is still another object of this invention to provide an electromagnetic shock apparatus enabling independent variation of the shock pulse characteristics by simple manipulation of electrical components in a control circuit. Thus, by movement of a few controls, the height, shape and length of the force curve may be rapidly and accurately changed. Moreover, the same curve can be accurately reproduced when desired at any later date. The three electrical parameters correlative to the resulting physical shock characteristics imparted to the specimen, are widely variable in a closely controlled manner to achieve practically any desired physical shock characteristic.

These and many other objects of this invention will be apparent upon studying the following specification in conjunction with the drawings in which:

FIG. 3 is a schematic circuit diagram of the electrical control and discharge circuitry for the apparatus;

Figure 5:
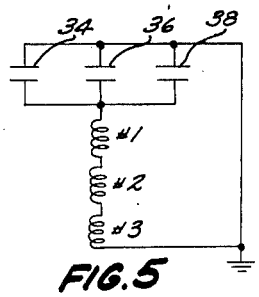
Figure 6:
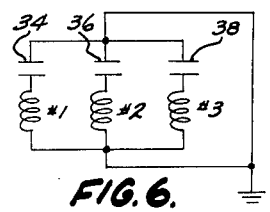
Figures 7, 8:
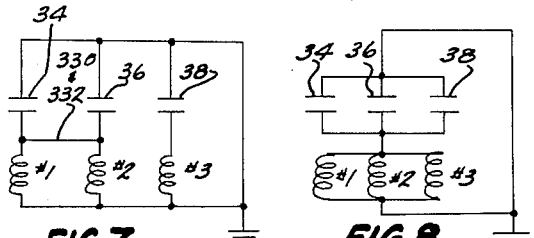

FIGS. 4a–g constitutes a few representative shock impulse curves of the vast number of potential curves capable of being formed by varying the electrical controls of the circuit;

FIG. 5 is a partial schematic circuit diagram representing a small portion of the discharge circuit in FIG. 3 under one operating condition;

FIG. 6 is a circuit diagram representing the same circuit portion under a second condition;

FIG. 7 is a circuit diagram representing the same circuit portion under a third condition; and FIG. 8 is a circuit diagram representing the same circuit portion under a fourth condition.

Basically, the inventive electromagnetic shock apparatus comprises field coil means, a carriage associated with the field coil and freely movable under the action of an electromagnetic force, the field coil having a plurality of independent windings, a driver coil on the carriage and having at least one winding, variable capacitor means for each of the independent windings and the driver coil to provide a variable shock pulse magnitude, and switching means between the capacitor means and the coils and adapted to provide a multiple of parallel and series relationships between the capacitor means and coils to provide variable pulse duration. Additional variable capacitor means is also provided in parallel with each of the windings to provide variable pulse increase rates to effectuate control of the pulse curve shape. The electrical input means for charging the capacitor means in series with the coils includes an electronic charge-timer and triggering means. Variable resistance means is included in the timer circuit to provide a sensitive or "fine" adjustment of the pulse magnitude. This is done by varying the capacitor charging time between activation of the timer and pulse discharge as the resistance is varied.

Figure 1:
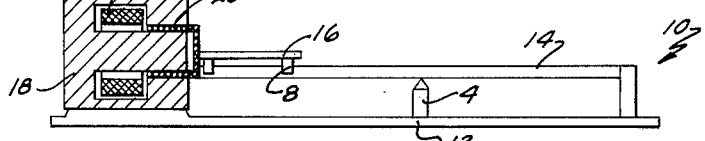
FIG. 1 is a side elevational schematic view of physical components of the shock apparatus.

Referring now to the drawings, in FIG. 1 the apparatus 10 is shown including a base 12 upon which a slide or guide track 14 is longitudinally mounted. This may comprise a pair of rails or other suitable structure. Adapted to move along the slide is a carrier 16 which essentially is a freely moving body subject, at least initially during the main pulse, only to electromagnetic forces (to be discussed) and to slight frictional drag along track 14. If the track cannot be made with sufficient length to allow gradual stopping of the carriage, and it is not desirable to have the carriage hit a bumper at the track end, a braking means may be supplied. This may be a frictional brake in supports 8 assuming any of a variety of forms. For example, it can be a spring loaded device triggered by a brake actuator 4 as the carriage 16 passes. Thus, the carriage will not strike track supports 6. This is optional. The brake is not initiated until after the driver coil 20 is free of influence from coil 22 and core 18, and after the significant portions of the pulse have been completed. Ordinarily, the stopping pulse should be no greater than about 20% of the main pulse in the opposite direction, but this will vary with test conditions and specifications. Fixedly mounted to the platform is a magnetic core 18 for conducting magnetic lines of force. Within the core is mounted a field coil 22. Mounted to the carriage and cooperating with core 18 and coil 22 is a driver coil 20. When an electrical pulse is applied to the field coil 22 and driver coil 20, carriage 16 and any specimen mounted thereon will be accelerated and propelled down track 14 under the influence of the electromagnetic pulse or force produced. The only force other than the main pulse is a slight frictional drag along the track. The track may be of any suitable length depending upon the circumstances, i.e., size of apparatus, weight of specimen, etc. No springs or other biasing forces act upon the carriage or specimen during pulse formation since this would destroy the particular curve shape desired, and would tend to produce the same pulse curve every time.

Figure 2:
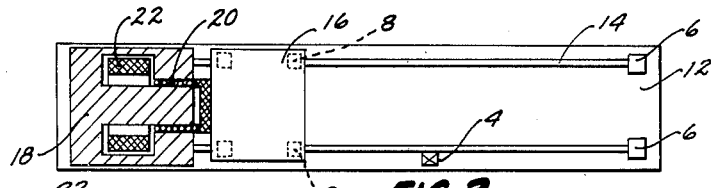
FIG. 2 is a plan view of the apparatus illustrated in FIG. 1.

The apparatus as shown in FIGS. 1 and 2 may be readily formed from conventional devices already on the market. The core, driver coil, and field coil may comprise essential parts of a typical vibrator, after the springs are removed. In other words, instead of the electromagnetic pulse causing movement of the carriage, followed by its return under the action of springs to its original position for a second pulse as in the conventional vibrator, the carriage and field coil are actually released to move down the track.

In order to produce an almost infinite variety of pulse curves when plotted in terms of magnitude versus time or duration, a unique electrical control circuit illustrated in FIG. 3 is utilized. This circuit 30 includes charge receiving capacitor means 32, 34, 36 and 38. Each is shown composed of a bank of four capacitors to give variable capacitance through adjustment of switches S4, S5, S6 and S7. These control the pulse amplitude or magnitude. The banks of capacitors 32, 34, 36 and 38, which correlate respectively with the driver coil 20 and the three field windings 1, 2 and 3, control the "coarse" adjustment for the "G" level, i.e., the pulse amplitude. The "fine" adjustment is achieved through a variable resistance in the charge timer.

Circuit 30 also includes a power supply 155, an electronic charge timer 42, the driver coil 20, and the field coil 22 composed of field windings No. 1, No. 2 and No. 3. By controlling the pulse discharges through these field windings the duration of the composite driving pulse may be varied and controlled. This is accomplished by the pulse duration selector or switching means S8 including switches 50, 52, 54, 56, 58, 60, 62 and 64.

The complete circuit also includes a second bank of normally uncharged capacitors 68 which determine the shape or rate of increase of the pulse. This bank is controlled by the general switching means S10, including switches 70, 72, 74, 76, 78, 80 and 82 which control the banks of parallel capacitors 84, 86, 88, 90, 92, 94 and 96.

A plurality of four relay control switches 100, 102, 104 and 106 are controlled by relay RY1 to determine the charging period for capacitors 32, 34, 36 and 38. The capacitors 32, 34, 36 and 38 are electrically associated alternately with coils 20 and 22 and with a charging line 110.

For safety reasons, relay RY1 shorts the energy storage capacitors to ground G2 through their respective field windings whenever the equipment is turned off, and also between shock tests. It acts as a fail-safe relay.

The electronic charge-timer 42 basically comprises an RC circuit. It is activated by a manual switch S9. It includes a neon pulse generator 12 which fires a thyratron V1 to excite the relay coil of relay RY3. This relay initiates circuit action which results in the throwing of switches 100, 102, 104 and 106 from the charging line 110 to a position in series with the driver coil and field coil, thereby creating the pulse.

An alternating voltage, for example 115, 60 cycles, is applied across points 150 and 152 of the D.C. power supply 155. A suitable breaker 40 comprising a relay-operated switch S1 controls the power supply in combination with door interlock switches S2 and S3. The power is applied to the primary coil of the charge-timer power supply transformer T1, and to points 154 and 156 leading to a rectifier or D.C. generator forming a D.C. power supply 155 with an output across terminals 160 and 161. This D.C. power supply provides power for relays RY1, RY2, and to charging line 110. The transformer T1 also supplies the voltage for the thyratron heater circuit 180. A suitable indicator bulb I1 across the heater may be used to show equipment activation. It also supplies power to the neon igniter I2 and thyratron V1 grid through rectifiers 182 and 184 in a manner to be explained hereinafter. Capacitors C38 and C39 are for stabilizing purposes.

Potentiometer RV2 in series with diode 182 determines the operating bias of thyraton V1 and normally remains fixed. The potentiometer RV1 in series with diode 184 may be varied before pulse firing to provide a "fine" adjustment of charging time, and hence pulse magnitude. Capacitors C42 and C43 are filter capacitors which coact with diodes 182 and 184 to maintain the slider of RV2 at a negative potential with respect to ground and the slider of RV1 at a positive potential with respect to ground. Capacitor C41 and the portion of RV1 above the slider together form an RC network which gradually raises the potential at the lower end I2 from the ground potential to a level sufficiently positive to fire igniter I2 at the end of a predetermined interval following energization of the charging circuit. This interval can be adjusted by potentiometer RV1 and constitutes the "fine" adjustment of the pulse amplitude.

During operation of the apparatus, alternating current voltage is supplied across points 150 and 152. Closing of switch S1 and switches S2 and S3 supplies power to the transformer T1 and the D.C. power supply 155. Initially no D.C. circuits from power supply 155 are complete. Also, initially the only alternating current circuit activator from transformer T1 is the heater circuit 180 for the thyratron V1.

Assuming for the moment that (1) the "coarse" adjustment for the pulse magnitude is properly set by switches S4, S5, S6 and S7, and the "fine" adjustment is made on rheostat RV1, that (2) the pulse duration is properly selected by switch means S8, and that (3) the rate of pulse increase is selected by switch means S10, the operator then momentarily depresses the "shock" button to close switch S9 in the charge-timer circuit 42. This causes D.C. power to flow from power supply 155, through switch S9, line 200, relay RY1 and to ground G1. Relay RY1 then closes switches 100, 102, 104 and 106 to place the banks of capacitors 32, 34, 36 and 38 in series with the charging line 110 to enable the D.C. power supply 155 to charge these plurality of capacitor banks. Ammeter 162 is provided in the charging circuit 110 to indicate the charging current. Rheostat R1 is normally factory-adjusted to limit the peak charging current to a safe value. D.C. current through switch S9 and line 200 also passes through the coil of relay RY2 and to ground G1. Relay coil RY2 closes the normally open switches 112 and 114. Closing of switch 112 causes D.C. power to pass from power supply 155, through the line 202 to normally closed switch 108, through the energized normally open switch 112, through both relays RY1 and RY2 in parallel with each other, and to ground G1. Thus, release of the push button switch to S9 by the operator does not release the power to relays RY1 and RY2.

Closing of switch 114 by relay RY2 causes A.C. power to flow from the secondary coil of transformer T1, through line 204, switch 114, line 206, to diodes 182 and 184. Rectified D.C. then flows from diode 184 to potentiometer RV1, and line 208, to charge timing capacitor C41 positively at its junction with the neon tube I2. The alternating current passed through diode 182 is simultaneously rectified and applies a negative potential through potentiometer RV2, and line 16 to the junction of the neon tube I2, and R2, the grid resistor of thyratron V1. The negative potential on line 210 also supplies the negative bias potential to the grid 212 of the thyratron V1, thereby preventing it from firing.

The time of build-up of timing capacitor C41 on the positive side of the neon tube to obtain a potential necessary to fire across the neon tube I2 is determined by the rate of charging of this capacitor. This rate of charging is capable of being controlled by potentiometer RV1, which is adjusted before pressing switch S9 to raise or lower the current rate and thereby to shorten or lengthen the time required to obtain the necessary potential for firing across the neon tube.

The cathode of thyratron V1 is grounded. Consequently, since a negative bias is normally applied to grid 212 the thyratron does not normally fire. However, as soon as the charge builds up on capacitor C41 sufficiently to fire neon tube I2, the negative potential impressed upon the grid 212 is replaced by a positive surge, thereby allowing the thyratron to fire. This causes a current surge to pass through relay RY3, thereby opening normally closed switch 108. Opening switch 108 stops current passage through relay RY1, thereby throwing switches 100, 102, 104 and 106 upwardly to their normal position illustrated in FIG. 3. As soon as these latter switches are thrown, the banks of capacitors 32, 34, 36 and 38 discharge through the driver coil winding and the field windings.

In the apparatus as illustrated, capacitor bank 32 discharges through switch S4, switch 100, and the driver coil 20 to ground G1. As illustrated, the three capacitor banks 34, 36 and 38 are in parallel and discharge respectively through their switches 102, 104 and 106. However, the pulse duration selector switch means S8, when in position 1 as illustrated with all of the switches 50, 52, 54, 56, 58, 60, 62 and 64 in position 1, places the three field windings 1, 2 and 3 in series with each other, and in series with the parallel capacitor banks. In other words, current from capacitor bank 34 flows through line 300, and through switch 50, a portion of S8. Current from bank 36 flows through switch 104, line 302, switch 52, line 304, and up through switch 50 also. Likewise, current from bank 38 flows through switch 106, line 308, switch 54, line 310, switch 52, line 304, and switch 50 also. The charge from all three banks of parallel capacitors passes through line 312, field winding 1, switch 58, line 314, switch 60, field winding 2 (which is in series with No. 1), switch 62, line 316, switch 64, field winding 3 (in series with Nos. 1 and 2), line 318 and to ground G1. Since the series connection of the field windings results in a maximum total field impedance, placing the three coil windings in series produces the maximum duration of the pulse discharge.

It will be readily realized that by manipulation of the selector switches S4, S5, S6 and S7, a variety of capacitor values may be applied to any one bank of capacitors. Thus, the composite capacitance forming the pulse may be any of a large variety of pulse magnitudes. It will be realized that the four capacitors shown in parallel for each of these selectors may be widely varied in number and arrangement, depending upon the desired results. It should also be realized that although three field windings provide a sufficient number of pulse duration conditions for many uses, the number of field windings together with sufficient switching means to vary the interconnection may be increased or decreased to suit the situation. Individual variation of the settings of selector switches S4 through S7 provides a "coarse" adjustment for the pulse magnitude or amplitude, the exact setting of each switch to produce a desired pulse at a given setting of the field winding connections being best determined empirically. A "fine" adjustment of the pulse magnitude is obtained by adjustment of the resistor RV1. By shortening or lengthening the time of charging of the capacitor banks 32, 34, 36 and 38 with adjustment of resistor RV1, the amount of charge placed on the capacitor banks during the selected charging period will vary, thereby providing a continuously adjustable pulse magnitude variation. By properly manipulating both adjustments, any desired magnitude may be obtained in a closely controlled manner.

In addition to the "coarse" and "fine" adjustments provided for the amplitude or magnitude of the pulse, pulse duration is variable through the multiple-pole pulse duration selector switch S8, which in the embodiment described includes four different switch positions.

The driver coil may also be provided with more than one winding if desired. Their arrangement could provide even greater flexibility.

In position No. 1 as illustrated in FIG. 3, the longest time for the pulse discharge is obtained since the maximum field inductance is achieved by placing the three field windings 1, 2 and 3 in series with each other. In this position, the capacitor banks 34, 36 and 38 are in parallel with each other and in series with the series-connected field windings as illustrated by the fragmentary circuit diagram in FIG. 5.

When the selector S8 is placed in position No. 2, each of the capacitor banks 34, 36 and 38 supplies one of the field windings No. 1, 2 and 3 to form three parallel LC circuits discharging to ground G1. In other words, the charge from capacitor 34 passes through switch S5, switch 102, lines 300, switch 50, line 312, field winding No. 1, switch 58 to line 318 and to ground. Capacitors 36 and 38 likewise discharge, respectively, through the field windings 2 and 3. In this position, therefore, the time of pulse duration is shorter than in position No. 1, since the three windings are passing current simultaneously and in parallel. This circuit is illustrated more clearly in FIG. 6.

In position No. 3, field windings No. 1 and 2 and their respective capacitor banks 34 and 36 are placed in parallel relationship with each other due to the line 330–332 which connects contacts 3 of the switches 56 and 60. Thus, the capacitor banks 34 and 36 are in parallel with each other and in series with the parallel-connected field windings No. 1 and 2, as illustrated by FIG. 7, while capacitor bank 38 is connected by itself in series with its field winding No. 3 as illustrated in FIG. 7.

In position No. 4 of selector S8, the three capacitor banks 34, 36 and 38 are in parallel with each other as illustrated in FIG. 8 and are connected in series with the three field windings, which are in parallel with each other due to the connection between position 4 of the switches 56, 60 and 64 with lines 340 and 342. In position No. 4 the shortest pulse time is obtained because the total field impedance is minimum due to the parallel connection of windings 1, 2 and 3. It will thus be realized that the pulse duration selector S8 is capable of achieving pulse times varying greatly to produce accurately controlled pulse times merely by selection of the proper switch position. Although normally the capacitor values as well as the field coils would determine the duration of discharge in an LC circuit, in this circuit the capacitors are of very high values and create a saturation condition during discharge across the coils. Therefore, the only substantial time variation is caused by the switching of the coils. The capacitance of the capacitor banks affects essentially only the pulse amplitude.

With the discharge through the driver coil 20 and through the field windings 1, 2 and 3, the electromagnetic forces set up therebetween create a repulsive effect which propels the drive coil 20 and carriage 16 down the track 14. The large acceleration occurring as a result of this force supplies a physical shock to the specimen mounted on the carriage 16.

The amount of shock applied to the physical specimen will vary directly with the electrical capacitance parameter selected by the selectors S4, S5, S6 and S7. The duration of the physical shock applied to the specimen will be varied by the selection of the winding connections with switch S8. For example, if position 1 is chosen, a pulse and shock will occur which extends for a longer period of time, due to the fact that the field windings are in series with each other. In position 4 of the selector S8, the time or duration of the shock will be shortened because the three windings are in parallel.

The rate of "G" increase or physical shock build-up, i.e. the pulse shape, is controlled by pulse shaping selector S10. Selector S10 comprises the plurality of multiple throw switches 70, 72, 74, 76, 78, 80 and 82 connected across the several banks of capacitors as shown. With selector S10 in position No. 1, none of the banks of capacitors are in the circuit. Therefore, the rate control capacitors have no effect on the discharge through the field windings. When the selector is placed in position No. 2, selected ones of the capacitors in the capacitor banks 84, 86, 88, 90, 92, 94 and 96 are placed in parallel with the field windings 1, 2 and 3. Thus, as the main capacitor banks 34, 36 and 38 discharge to the field windings, since the windings include an inherent lag, the selector capacitors of the rate control banks in parallel with the field windings tend to store up a charge and slowly feed it back through the field windings as the flow of current increases through the windings. By placing the selector S10 in its various positions different capacitance values are obtained to vary the shaping effect and obtain any desired rate of increase of the pulse. This will be understood more specifically from reference to FIGS. 4a–g which are curves exemplifying the almost infinite variety of shock pulses which can be obtained with this novel apparatus, simply by varying the three electrical parameters which control the three important pulse characteristics of the curve.

Figure 4A:
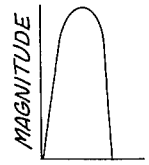
Figure 4B:
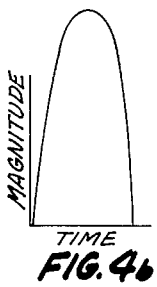
Figure 4C:
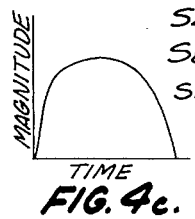

Referring to FIG. 4a, a sample curve is shown when magnitude is plotted against time with the switches S4 through S7 in position 1, selector switch S8 in position 2, and rate or shape selector switch S10 in position 1. In 4b, the "coarse" adjustment for the pulse amplitude obtained through switches 4 through 7 has been shifted by placing one or more of the selector switches S4, S5, S6 and S7 in position 2.. This increases the amplitude as shown in FIG. 4b. If switches S4 through S7 are in position 1, selector S8 is in position 1, and selector S10 is in position 1, the duration of the pulse is increased as illustrated in FIG. 4c.

Figure 4D:

If selectors S4 through S7 are in position 1, selector S10 is in position 1, and selector S8 is placed in position 3, a curve similar to that shown in FIG. 4d could result. (See FIG. 7 for the circuit used.) Of course, this curve could vary widely depending upon the capacitance value selected on each of the switches S4, S5, S6 and S7. It should be realized that the curves illustrated are merely examples of what could be obtained, since the complete size and shape of these curves can be widely varied at will.

Figure 4E:
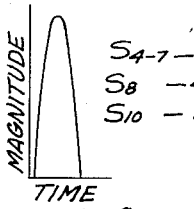
Figure 4F:
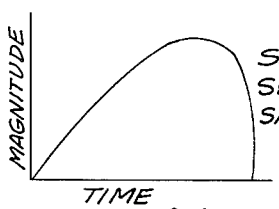
Figure 4G:
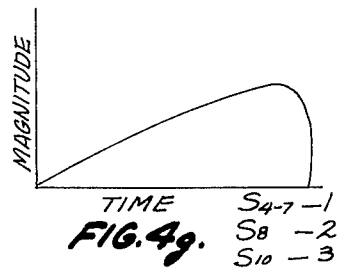

If selector S8 is placed in position 4, a very rapid pulse as indicated in FIG. 4e can result. By varying selector S10 as shown for example in FIGS. 4f and 4g, the rate of increase can be sharply affected, to completely change the shape of the curves as illustrated. In FIG. 4f, selector S10 is placed in position 2 to lessen the slope, i.e. lessen the rate of pulse increase. It is even further lessened in position 3 of S10 as shown in FIG. 4g. The examples shown are few, the potentialities are almost infinite.

It will be obvious to those familiar with the art, that the possible test conditions which can be applied to the specimen mounted on platform 16 can be varied tremendously simply by varying the three electrical parameters within the principles of the apparatus and invention as taught. Obvious modifications can be made to this apparatus within the principles taught, and thus this invention is to be limited only by the scope of the appended claims and the reasonably equivalent structures to those defined therein.

I claim:
1. A physical shock imparting apparatus including elongated track means, carriage means mounted movably on said track means, and a control pulse circuit for electromagnetically actuating the apparatus comprising: driver coil means on said carriage means; field coil means on said track means; capacitor means in series with said field coil means to produce a current pulse therethrough; electrical power supply means; switching means electrically connecting said power supply means to said capacitor means in one position, and connecting said capacitor means to said field coil means in the second position; and electrical circuitry means operatively electrically connected with said capacitor means, field coil means, and electrical power supply means to effect complete control of the pulse discharge curve shape, including means to vary the intensity of pulse discharge from said capacitor means, means to vary the duration of pulse discharge from said capacitor means, and means to vary the shape of pulse discharge from said capacitor means.

2. The circuit in claim 1 wherein said intensity varying means comprises a coarse adjustment means for varying the capacitance of said capacitor means and a fine adjustment means comprising means controlling the charging time of said capacitor means.

3. An electromagnetically actuated, physical shock apparatus comprising: a first coil mounted in a stationary manner; track means; a specimen-carrying device adapted to move freely on said track means; a second coil on said device and adapted to cooperate with said driver coil to impart an electromagnetic force to said device when said coils are energizeed; capacitor means in electrical series with said first coil; power supply means to charge said capacitor means; switch means electrically connecting said power supply means and said capacitor means in one position and said capacitor means and said first coil in its second position, to apply a momentary, limited pulse across said first coil; and capacitor means in electrical parallel with said first coil to vary the rate of pulse discharge across said first coil.

4. Electromagnetic pulse apparatus for imparting a controlled, sudden, momentary, physical shock to an object comprising: an elongated restraining track means; an object carrying carriage movably mounted on said track means; a fixed magnetic field coil affixed at one end of said track means; a driver coil on said carriage, interfittable with said field coil in only the initial position of said carriage at said one end to impart only a momentary electromagnetic impulse to said driver coil when energized, to apply a momentary physical shock force to said cariage for movement thereof along said track means; variable capacitor means; power supply means; controlled switch means from said capacitor means and electrically connectable alternately with said field coil and said power supply means; and an electrical trigger circuit operably associated with said switch means to disconnect said capacitor means from said power supply means and connect said capacitor means to said field coil to cause a momentary impulse through said field coil, to thereby impart a momentary physical shock force to said carriage and said object.

5. Electromagnetic pulse apparatus for imparting a controlled, sudden, momentary, physical shock to an object comprising: an elongated restraining track means; an object carrying carriage movably mounted on said track means; a fixed magnetic field coil affixed at one end of said track means; a driver coil on said carriage interfittable with said field coil in only the initial position of said carriage, at said one end, to impart only a momentary electromagnetic impulse to said driver coil when energized, to apply a momentary physical shock force to said carriage for movement thereof along said track means; variable capacitor means in electrical parallel with said field coil to allow variable setting of the electrical pulse discharge rate across said field coil; power supply means; a second variable capacitor means; controlled switch means from said second capacitor means and connectable alternately with said field coil and said power supply means; and an electrical trigger circuit operably associated with said switch means to disconnect said second capacitor means from said power supply means and connect said second capacitor means to said field coil, to cause a momentary impulse of controlled characteristics through said field coil, to thereby impart a physical shock force of corresponding characteristics to said carriage and said objects on said track means.

6. Electromagnetic pulse apparatus for imparting a controlled, sudden, momentary, physical shock to an object comprising: an elongated restraining track means; an object carrying carriage movably mounted on said track means; a fixed magnetic field coil affixed at one end of said track means; a driver coil on said carriage interfittable with said field coil in only the initial position of said carriage at said one end to impart a momentary electromagnetic impulse to said driver coil when energized, to apply a momentary physical shock force to said carriage for movement thereof along said track means; variable capacitor means in electrical parallel with said field coil to allow variable setting of the electrical pulse discharge rate across said field coil; power supply means; a second variable capacitor means; controlled switch means from said second capacitor means and connectable alternately with said field coil and said power supply means; an electrical trigger circuit operably associated with said switch means to control it and including electrical discharging means to trigger the circuit and operate said switch means to disconnect said second capacitor means from said power supply means and connect it to said field coil, causing a momentary impulse of controlled characteristics through said field coil, to thereby impart a physical shock force of corresponding characteristics to said carriage and said object on said track means; said trigger circuit including adjustable time delay means prior to firing and after actuation, and actuation switch means operably associated with said trigger circuit and between said power supply means and said controlled switch means to simultaneously initiate current flow to said second capacitor means and to said trigger circuit.

7. Electromagnetic pulse apparatus for imparting a controlled, sudden, momentary, physical shock to an object comprising: an elongated restraining track means; an object carrying carriage movably mounted on said track means; a fixed magnetic field coil affixed at one end of said track means; a driver coil on said carriage interfittable with said field coil in only the initial position of said carriage at said one end to impart a momentary electromagnetic impulse to said driver coil when energized, to apply a momentary physical shock force to said carriage for movement thereof along said track means; variable capacitor means in electrical parallel with said field coil to allow variable setting of the electrical pulse discharge rate across said field coil; power supply means; a second variable capacitor means; controlled switch means from said second capacitor means and connectable alternately with said field coil and said power supply means; an electrical trigger circuit operably associated with said switch means to control it and including electrical discharging means to trigger the circuit and operate said switch means to disconnect said second capacitor means from said power supply means and connect it to said field coil, causing a momentary impulse of controlled characteristics through said field coil, to thereby impart a physical shock of corresponding characteristics to said carriage and said object on said track means; said trigger circuit including resistance type current flow control means thereto from said power supply means, to vary the time of charging of said second capacitor means before discharge of said discharging means, and actuation switch means operably associated with said trigger circuit and between said power supply means and said controlled switch means to simultaneously initiate current flow to said second capacitor means and to said trigger circuit; said field coil having a plurality of independent windings, a plurality of parallel capacitors, and selector switch means between said windings and parallel capacitors for selecting various series and parallel relationships to adjust the shock characteristics.

References Cited by the Examiner

UNITED STATES PATENTS

| | | | |
|---|---|---|---|
| 1,780,081 | 10/30 | Keiser | 104—149 |
| 2,080,053 | 5/37 | Livingston | 317—151 X |
| 2,519,253 | 8/50 | Jones | 318—135 |
| 2,783,684 | 3/57 | Yoler | 124—3 |
| 2,794,929 | 6/57 | Adamski | 46—235 X |
| 2,870,675 | 1/59 | Salisbury | 124—3 |
| 2,960,636 | 11/60 | Fitzpatrick | 317—151 |

SAMUEL BERNSTEIN, *Primary Examiner.*